United States Patent [19]

Taig

[11] Patent Number: 5,201,387
[45] Date of Patent: * Apr. 13, 1993

[54] DISC BRAKE WITH VARIABLE WIDTH CALIPER AND POWERED ACTUATION

[75] Inventor: Alistair G. Taig, Edwardsburg, Mich.

[73] Assignee: Allied-Signal Inc., Morristown, N.J.

[*] Notice: The portion of the term of this patent subsequent to Nov. 10, 2009 has been disclaimed.

[21] Appl. No.: 788,960

[22] Filed: Nov. 7, 1991

Related U.S. Application Data

[63] Continuation-in-part of Ser. No. 704,586, May 22, 1991, Pat. No. 5,161,650.

[51] Int. Cl.⁵ .............................................. F16D 55/08
[52] U.S. Cl. .................................... 188/72.8; 188/71.9
[58] Field of Search .................... 188/71.1, 72.2, 72.3, 188/72.7, 72.8, 72.9, 71.7, 71.9, 106 R, 106 P, 106 F; 74/89.15, 89.17, 110, 422, 498

[56] References Cited

U.S. PATENT DOCUMENTS

| | | | |
|---|---|---|---|
| 3,040,717 | 6/1962 | Rumsey | 121/120 |
| 3,323,618 | 6/1967 | Riddy | 188/79.5 |
| 3,444,784 | 5/1969 | Wengerd | 91/413 |
| 3,610,373 | 10/1971 | Burnett | 188/71.9 |
| 3,647,031 | 3/1972 | Burnett | 188/72.6 |
| 3,835,960 | 9/1974 | Moss | 188/71.9 |
| 3,851,737 | 12/1974 | Hewins | 188/71.9 |
| 4,014,411 | 3/1977 | Troester | 188/71.9 |
| 4,031,985 | 6/1977 | Ito | 188/71.9 |
| 4,487,295 | 12/1984 | Mitchell | 188/72.6 |
| 4,598,801 | 7/1986 | Villata | 188/71.9 |
| 4,722,575 | 2/1988 | Graham | 303/2 |
| 4,776,439 | 10/1988 | Tickle et al. | 188/71.8 |
| 4,841,844 | 6/1989 | Tootle | 92/5 R |
| 5,000,294 | 3/1991 | Hunnicutt et al. | 188/71.9 |

FOREIGN PATENT DOCUMENTS

| | | |
|---|---|---|
| 3019288 | 11/1981 | Fed. Rep. of Germany . |
| 1228374 | 8/1960 | France . |
| 1531556 | 7/1968 | France . |
| 1114684 | 5/1968 | United Kingdom . |

Primary Examiner—Robert J. Oberleitner
Assistant Examiner—Chris Schwartz
Attorney, Agent, or Firm—Larry J. Palguta; Ken C. Decker

[57] ABSTRACT

The disc brake with variable width caliper and powered actuation comprises first and second bridge members (14, 15) connected to two movable members (20, 30) extending over the periphery of the rotor (51). An inboard end of each movable member includes threads having threadably mounted thereon a nut (28, 29). The nut has ratchet teeth on one axial end which engage ratchet teeth (10A, 11A) of an associated actuator sleeve (10, 11) disposed slidably about the movable member. Each sleeve includes gear teeth (10C, 11C) about its circumference. The second bridge member is mounted slidably upon the movable members. The teeth of the sleeves are engaged by a rack member (110). A piston (117) includes an arm (125) connecting the piston with a rack (130) of the rack member so that hydraulic pressure effect displacement of the piston and a lateral displacement of the rack. The lateral movement of the rack thereby effects rotation of the sleeves which, through the engaged ratchet teeth (10A, 11A) causes the nuts to rotate and effect translational movement of the movable members. The nuts (28, 29) translate along the movable members, displace the second bridge member and a friction lining mechanism (16) against the rotor, and by reaction, the movable members bring a friction lining of the first bridge member into engagement with the other face of the rotor.

20 Claims, 2 Drawing Sheets

DISC BRAKE WITH VARIABLE WIDTH CALIPER AND POWERED ACTUATION

This is a continuation-in-part of copending U.S. Ser. No. 07/704,586 filed May 22, 1991, now U.S. Pat. No. 5,161,650.

The present invention relates generally to a disc brake, and in particular to a disc brake with a variable width caliper.

Many types of disc brakes have been proposed over the years. A disc brake with a variable width type of caliper has been proposed previously in French Patent No. 1,531,556 published Jul. 5, 1968. However, current production brake calipers typically utilize a rigid caliper structure which spans the rotor disc in order to carry inner and outer brake pads and react the clamping loads. The majority of service brake calipers contain one or more pistons which can be displaced, hydraulically, to apply the clamping forces to the shoes. As the friction pads wear, the pistons must extend from their cylinder bores and the hydraulic system must have a sufficient capacity to make up the changes in required fluid volume. It is highly desirable to provide a disc brake which can Provide the service braking function by mechanical actuation and thus not require any hydraulic fluid for actuation. It is desirable that such a disc brake contain as few parts as possible, be highly reliable, and effect large clamping loads for braking. It is also advantageous if such a disc brake could contain hydraulically actuated pistons for service braking, while retaining the mechanical actuation function for parking brake applications and also provide automatic wear adjustment so that changes in fluid volume requirements are minimal. It is highly advantageous if such a disc brake comprises easily assembled members having high stiffness and low weight, resulting in the service pistons needing to travel only a distance sufficient to take up the running clearance of the brake and pad deflections. If the brake contains high stiffness and low weight components, the inherently stiff caliper assembly reduces the hydraulic fluid requirement of the brake system and also reduces the size and power requirements of a brake booster utilized for service braking. It is also highly desirable and advantageous to provide a hydraulically powered mechanism for actuating the disc brake, and in particular for actuating the disc brake for parking brake applications.

The above problems are solved by the present invention which comprises a disc brake with a variable width caliper and powered actuation, comprising a pair of spaced-apart movable members extending across a rotor of a vehicle, each movable member connected with a first bridge member and a second bridge member, each of the bridge members including friction lining means, each movable member having at one end thereof thread means receiving threadably thereon nut means, one axial end of each nut means including teeth means, an actuator sleeve about each movable member and having at one axial surface teeth means which engage the teeth means of a respective nut means, each actuator sleeve having gear teeth thereabout, the second bridge member received slidably on the movable members, and a powered rack member having teeth which engage the gear teeth of the actuator sleeves, so that operation of the powered rack member effects rotation of the actuator sleeves which cause the nut means to rotate and effect translational movement of the movable members whereby the bridge members bring the respective friction lining means into engagement with said rotor.

One way of carrying out the invention is described in detail below with reference to the drawings which illustrate an embodiment in which.

Figure 1:
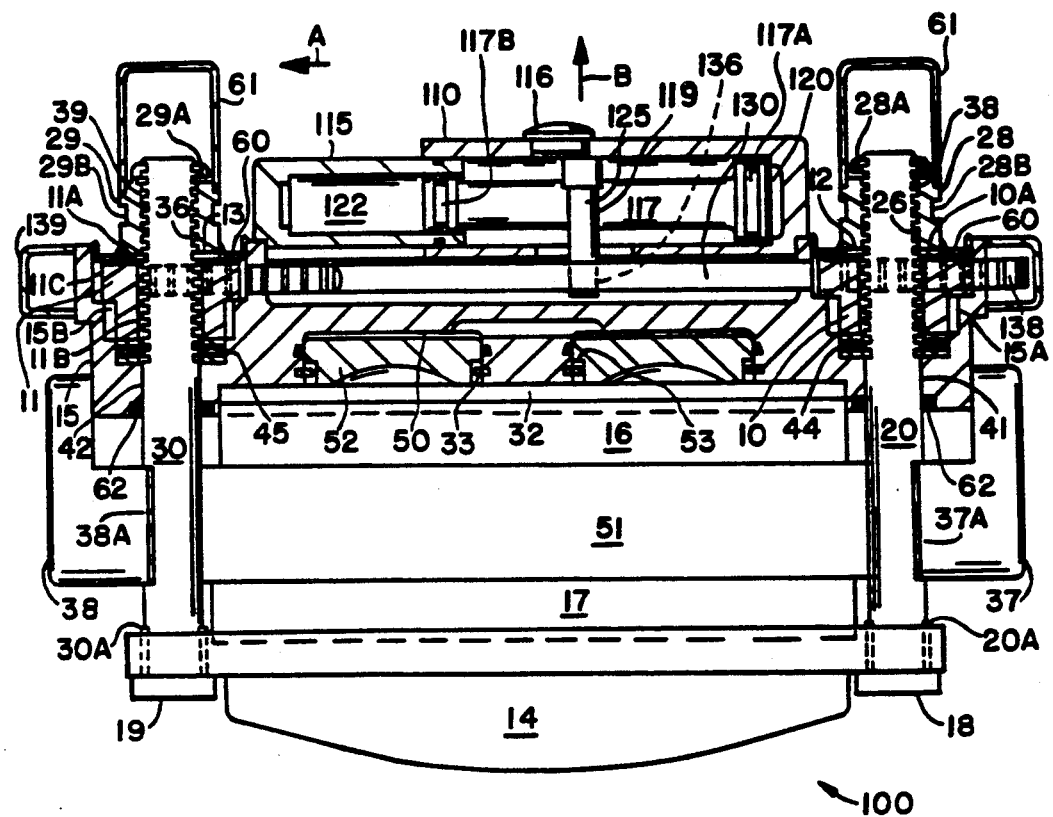
FIG. 1 is a top partial section view of a disc brake of the present invention.
Figure 2:
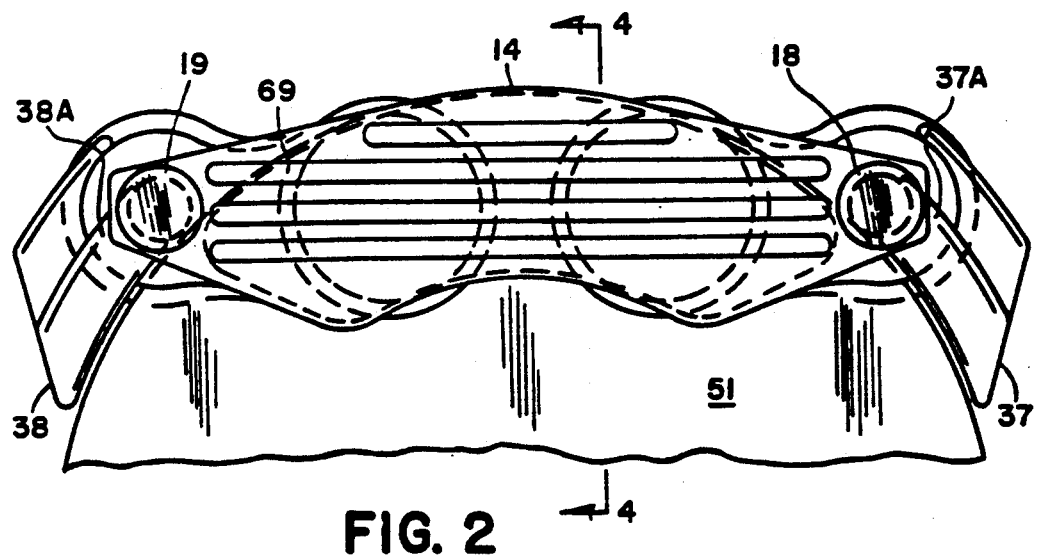
FIG. 2 is a side view of the disc brake of the present invention.
Figure 3:
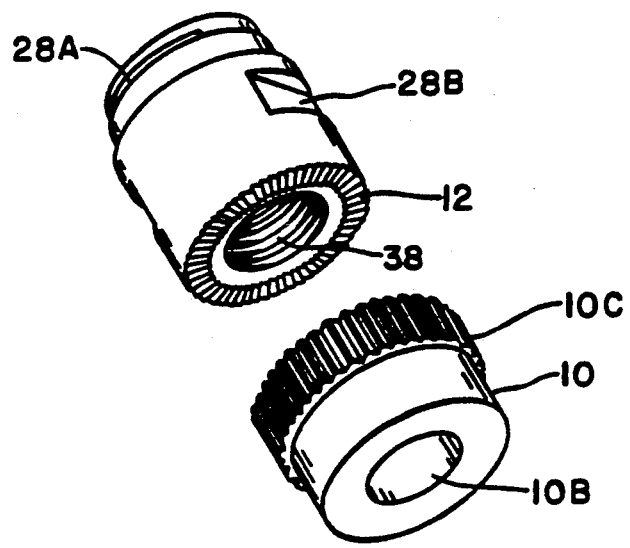
FIG. 3 is an exploded view of an actuator sleeve and associated nut.
Figure 4:
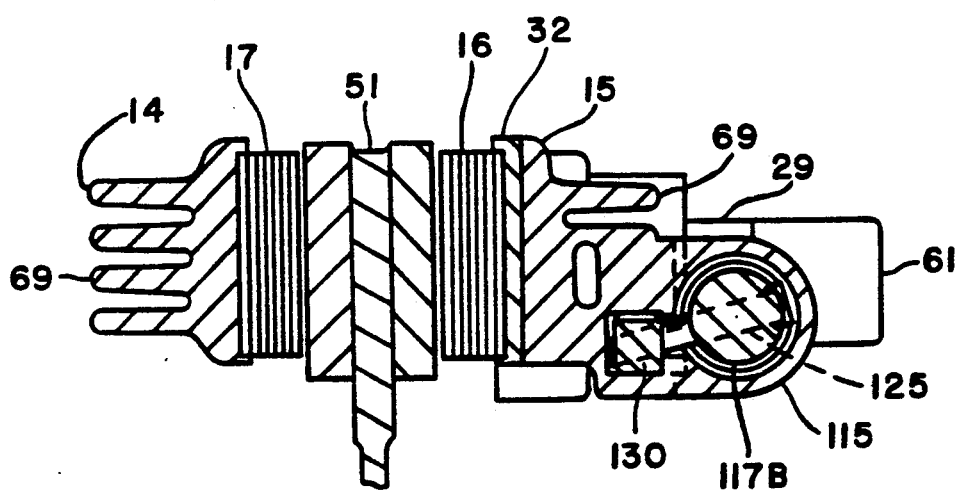
FIG. 4 is a section view taken along view line 4-4 of FIG. 2.

Referring to FIG. 1, the disc brake of the present invention is designated generally by reference numeral 100. Disc brake 100 comprises first or outboard bridge member 14 and second or inboard bridge member 15, each connected with a pair of pins or movable members 20 and 30. Pins 20, 30 are nonrotatably connected with bridge member 14 via splines 20A, 30A. Second bridge member 15 includes a pair of spaced apart axial openings 41 and 42 receiving therein movable members 20, 30. Second bridge member 15 includes friction lining means 16 having backing plate 32, while first bridge member 14 includes friction lining means 17 which is carried by member 14 and does not have a backing plate. Located between the friction material linings 16 and 17 is rotor 51. An anchor plate includes anchor plate extensions 37, 38 (see FIG. 2) having curved ends 37A, 38A which capture and slidingly receive the respective movable members. Bridge members 14 and 15 have fins 69 (see FIG. 4) for heat dissipation. Movable members 20, 30 include respective threads 26 and 36 which comprise single start threads which are irreversible. A pair of nuts 28 and 29 include internal threads 38 and 39 which engage the respective threads 26, 36. Each nut includes transverse opening 28A or 29A (see FIG. 3) which allows the respective nut to be deformed slightly during manufacture, so that axial deformation of the nut creates a friction or rotational drag between the internal threads of the nuts and the threads of the movable members. The rotational drag is important during the release phase of braking, as will be explained below. Nuts 28, 29 each contain respective slots 28B, 29B for manual rotation and ratchet teeth 12, 13 on one axial end thereof which engage correspondingly shaped ratchet teeth 10A and 11A on axial faces of respective actuator sleeves 10 and 11. The actuator sleeves include internal through openings 10B, 11B which permit the actuator sleeves to be mounted axially slidable about the threads of the movable members. Actuator sleeves 10 and 11 each include respective gear teeth 10C, 11C about the outer circumference thereof. Second bridge member 15 includes a pair of axial recesses 15A, 15B which receive therein roller thrust bearings 44, 45 and the respective actuator sleeves 10, 11. Seals 60 extend from second bridge member 15 to nuts 28, 29 to enclose the openings of the respective recesses 15A, 15B and prevent contaminants from entering therein. Caps 61 are attached to the nuts 28, 29 to keep contaminants out of the thread interfaces with the movable members 20, 30. Second bridge member 15 also includes a pair of seals 62 at the ends of the axial openings 41, 42 in order to prevent contaminants from entering the interface between bushings 35, 36 and movable members 20, 30.

Second bridge member 15 includes powered rack member 110 comprising housing 115 which houses therein double ended piston 117. Double ended piston 117 has oppositely disposed, sealed piston ends 117A and 117B which with housing 115 define hydraulic pressure chambers 120 and 122. Connecting arm 125 extends fixedly through center opening 119 of piston 117, and is received fixedly within hole 136 (or optionally within a notch) of movable rack 130 that includes on one side thereof teeth 138. Housing 115 includes assembly plug 116. Second bridge member 115 also includes rack housing 139 which houses movable rack 130. As shown in FIG. 1, rack teeth 138 engage the circumferentially outer gear teeth 10C, 11C of actuator sleeves 10 and 11. Each of the hydraulic pressure chambers 120, 122 may receive hydraulic fluid pressure or have hydraulic fluid pressure exit the chamber by a not shown operatively connected hydraulic control mechanism which effects a corresponding introduction of pressurized hydraulic fluid into one chamber while opening the other chamber for an exit of hydraulic fluid pressure therefrom. Thus, the control mechanism can effect translational movement of double ended piston 117 and, correspondingly, translational movement of rack member 130.

During a service or Parking brake application, the hydraulic controller effects the transmission of hydraulic fluid pressure to chamber 120 while opening hydraulic Pressure chamber 122 for a return or venting flow of hydraulic fluid therefrom. Double ended piston 117 is caused to translate in the direction of Arrow A in FIG. 1 so that the operatively connected rack 130 translates in the same direction. The movement of rack 130 causes, by means of teeth 138, 10C and 11C, actuator sleeves 10 and 11 to rotate whereby ratchet teeth 10A and 11A engage ratchet teeth 12, 13 of nuts 28, 29 and cause rotation thereof. Rotation of nuts 28, 29 causes translational movement of movable members 20, 30 in the direction of Arrow B in FIG. 1 such that friction lining means 16 of second bridge member 15 is displaced via the roller thrust bearings into engagement with the corresponding surface of rotor 51. By reaction, heads 18 and 19 of movable members 20 and 30 cause first bridge member 14 to bring friction lining means 17 into engagement with the other face of rotor 51. When the braking application is completed, the single start threads of the movable members are essentially irreversible and thus the brake will remain in the applied position after hydraulic pressure is removed or dissipated from pressure chamber 120. When the braking application is to be reversed, hydraulic fluid pressure is introduced by the not shown hydraulic controller into pressure chamber 122 and pressure chamber 120 is vented. Double ended piston 117 translates back toward the at-rest position shown in FIG. 1, so that rack 130 moves toward the illustrated at-rest position. As rack 130 approaches its at-rest position illustrated in FIG. 1, and should there be a large clearance existing between the friction lining means and rotor, the ratchet teeth of the respective nuts and actuator sleeves will tend to separate due to the angled back face of the teeth illustrated in FIG. 3. When this occurs, the nuts will stop turning when the tips of the ratchet teeth disengage. After double ended piston 117 and rack 130 cease their translational movement and reach an at-rest position such that ratchetting ceases, the clearance between the friction lining means and rotor will be equal to the height of the ratchet teeth. In order to assist the operation of the adjustment mechanism, the rotational drag created for the nuts by the axial deformation of the nuts via transverse openings 28A, 29A, provides a frictional engagement between the threads of the nuts and the threads of the movable members so that as the ratchet teeth begin to disengage, the nuts will stop rotating and permit the respective ratchet teeth to disengage.

If it is desired that the disc brake with variable width caliper of the present invention include a hydraulic actuation mechanism, second bridge member 15 may include one or more piston bores 50 each having therein a piston 52 which, through a piston shoulder 53, may engage a retaining ring or abutment 33 that limits outward movement of the piston. Bores 50 receive, as is well-known in the art, hydraulic fluid from a pressure producing device such as a master cylinder or brake booster, which will cause each piston 52 to move outwardly against backing plate 32 and move friction lining means 16 into engagement with the associated face of rotor 51. By reaction, movable members 20, 30 bring friction lining means 17 of first bridge member 14 into engagement with the opposite surface of rotor 51.

One important feature of the disc brake of the Present invention is that when one or more pistons 50 are utilized for service brake application and nuts, actuator sleeves, and a movable rack and double ended piston are utilized for parking brake applications, the parking brake load exceeds the load effected by service braking. As a result, when the service and parking brake functions are effected simultaneously, load compounding cannot occur because the service brake load is carried through the parking actuator movable member and nut mechanisms. In other words, the disc brake has a maximum braking or clamping load which is defined by the parking load, and because this cannot be exceeded by the clamping force effected by the service brake pistons, load compounding does not occur.

I claim:

1. A disc brake with a variable width caliper and powered actuation, comprising a pair of spaced-apart movable members extending across a rotor of a vehicle, each movable member connected with a first bridge member and a second bridge member, each of the bridge members including friction lining means, each movable member having at one end thereof thread means receiving threadably thereon nut means, one axial end of each nut means including teeth means, an actuator sleeve about each movable member and having at one axial surface teeth means which engage the teeth means of a respective nut means, each actuator sleeve having gear teeth thereabout, the second bridge member received slidably on the movable members, and a powered rack member having teeth which engage the gear teeth of the actuator sleeves, so that operation of the powered rack member effects rotation of the actuator sleeves which cause the nut means to rotate and effect translational movement of the movable members whereby the bridge members bring the respective friction lining means into engagement with said rotor.

2. The disc brake in accordance with claim 1, wherein the powered rack member comprises a double ended piston connected with a rack.

3. The disc brake in accordance with claim 2, wherein the double ended piston is located within a housing so that each end of the piston defines with the housing a pressure chamber for hydraulic fluid.

4. The disc brake in accordance with claim 3, wherein the powered rack member and housing are a part of the second bridge member.

5. The disc brake in accordance with claim 1, wherein each nut means includes therein transverse opening means such that an associated axial portion of the nut means may be altered and threads of the nut means engage the threads of the respective movable member with a predetermined frictional engagement which resists rotation of the respective nut means.

6. The disc brake in accordance with claim 1, wherein each nut means includes a pair of circumferentially opposite outer slots in order to receive a tool for manual rotation of the nut means.

7. The disc brake in accordance with claim 1, wherein the second bridge member includes at least one bore with a piston disposed therein, the bore containing hydraulic fluid which, when pressurized, causes said piston to move outwardly and into engagement with the respective friction lining means.

8. The disc brake in accordance with claim 7, wherein the bore includes thereabout a retaining ring which limits the outward movement of said piston.

9. A disc brake with a variable width caliper and powered actuation, comprising a pair of spaced-apart movable members extending across a rotor of a vehicle and supported slidably by respective anchor plate extensions, each movable member connected with a first bridge member and a second bridge member, each of the bridge members including friction lining means, each movable member having at one end thereof thread means receiving threadably thereon nut means, one axial end of each nut means including teeth means, an actuator sleeve about each movable member and having at one axial surface teeth means which engage the teeth means of a respective nut means, each actuator sleeve having peripheral gear teeth, the second bridge member received slidably on the movable members, and a powered rack member having teeth which engage the peripheral gear teeth of the actuator sleeves, so that operation of the Powered rack member effects rotation of the actuator sleeves which cause the nut means to rotate and effect translational movement of the movable members whereby the bridge members engage the respective friction lining means with said rotor.

10. The disc brake in accordance with claim 9, wherein the powered rack member comprises a double ended piston connected by means of an arm with a rack.

11. The disc brake in accordance with claim 10, wherein the double ended piston is located within a housing so that each end of the piston defines with the housing a pressure chamber for hydraulic fluid.

12. The disc brake in accordance with claim 11, wherein the powered rack member and housing are a part of the second bridge member.

13. The disc brake in accordance with claim 11, wherein the housing includes a removable assembly plug in an opening in order to assist in the assembly of the arm with the piston and rack.

14. The disc brake in accordance with claim 10, wherein the piston and rack are disposed parallel to one another.

15. The disc brake in accordance with claim 9, wherein each nut means includes therein transverse opening means such that an associated axial portion of the nut means may be altered and threads of the nut means engage the threads of the respective movable member with a predetermined frictional engagement which resists rotation of the respective nut means.

16. The disc brake in accordance with claim 15, wherein each nut means includes a pair of circumferentially opposite outer slots in the nut in order to receive a tool for manual rotation of the nut means.

17. The disc brake in accordance with claim 9, wherein the second bridge member includes at least one bore with a piston disposed therein, the bore containing hydraulic fluid which, when pressurized, causes said piston to move outwardly and into engagement with the respective friction lining means.

18. The disc brake in accordance with claim 17, wherein the bore includes therabout a retaining ring which limits the outward movement of said piston.

19. The disc brake in accordance with claim 9, wherein at least one of the movable members has a circular head and splines which engage the first bridge member.

20. The disc brake in accordance with claim 9, wherein the second bridge member includes two bores with hydraulically actuated pistons therein.

* * * * *